United States Patent [19]
Senger

[11] 3,938,653
[45] Feb. 17, 1976

[54] APPARATUS FOR CONVEYING AND TURNING ARTICLES

[75] Inventor: Edmund Senger, Buttwil, Switzerland

[73] Assignee: Emhart Zurich S.A., Zurich, Switzerland

[22] Filed: Mar. 10, 1975

[21] Appl. No.: 556,993

[30] Foreign Application Priority Data
Mar. 11, 1974 Switzerland.......................... 3344/74

[52] U.S. Cl. .............................................. 198/283
[51] Int. Cl.² ......................................... B65G 47/24
[58] Field of Search ...... 198/282, 283, 257; 209/73, 209/111.7

[56] References Cited
UNITED STATES PATENTS

| | | | |
|---|---|---|---|
| 2,873,842 | 2/1959 | Erickson | 198/257 |
| 3,356,203 | 12/1967 | Noble et al. | 198/283 |
| 3,577,341 | 12/1951 | Magnusson | 198/284 |
| 3,690,456 | 9/1972 | Powers, Jr. | 198/283 |
| 3,814,232 | 6/1974 | Eriksson | 198/283 |

FOREIGN PATENTS OR APPLICATIONS
1,167,956 10/1969 United Kingdom................ 198/283

*Primary Examiner*—Allen N. Knowles
*Attorney, Agent, or Firm*—Laurence A. Savage

[57] ABSTRACT

An apparatus for conveying and turning articles is provided by the combination of a through belt which extends along the path of the articles parallel to a conveyor belt and cooperates therewith for the purpose of conveying the articles in a line, and a control roller and a pair of pressing rollers which trap the article therebetween and turn it at least one complete revolution in place.

6 Claims, 3 Drawing Figures

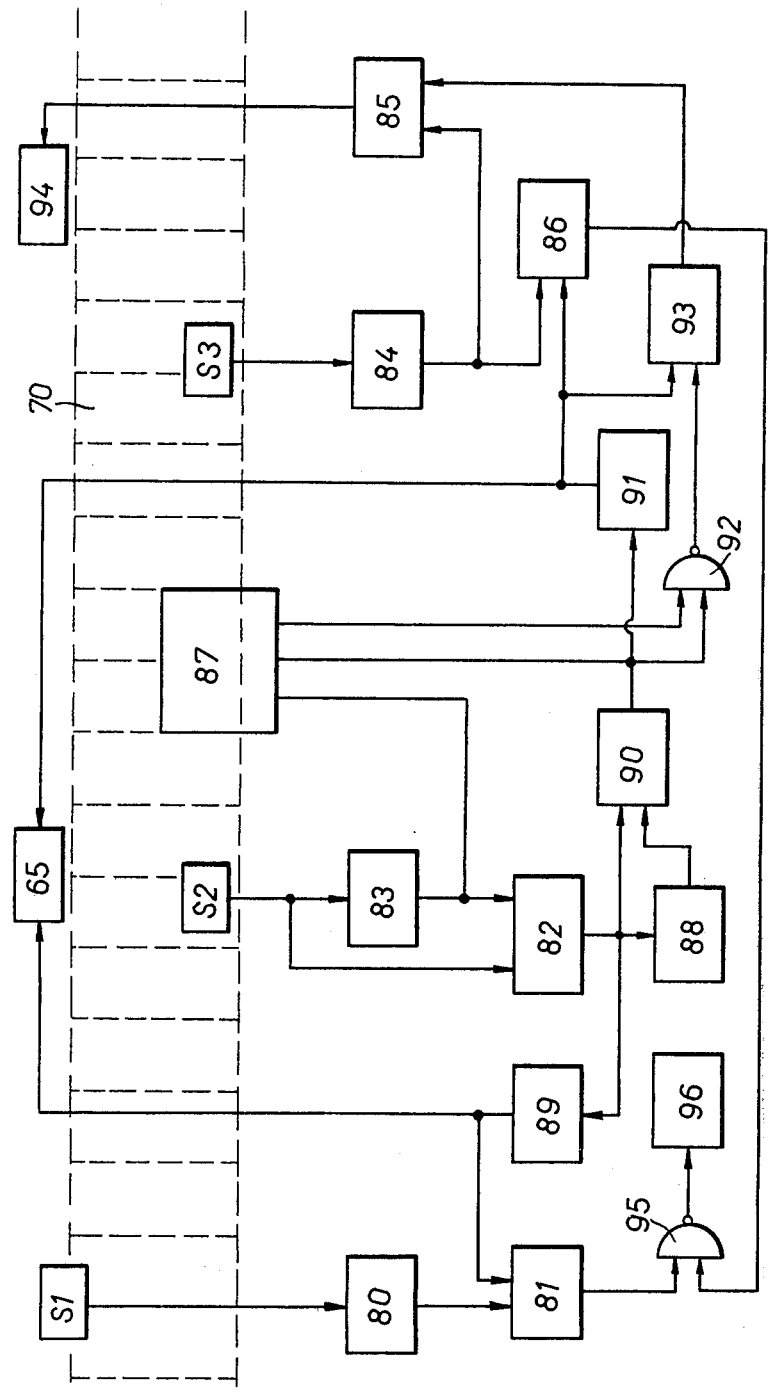

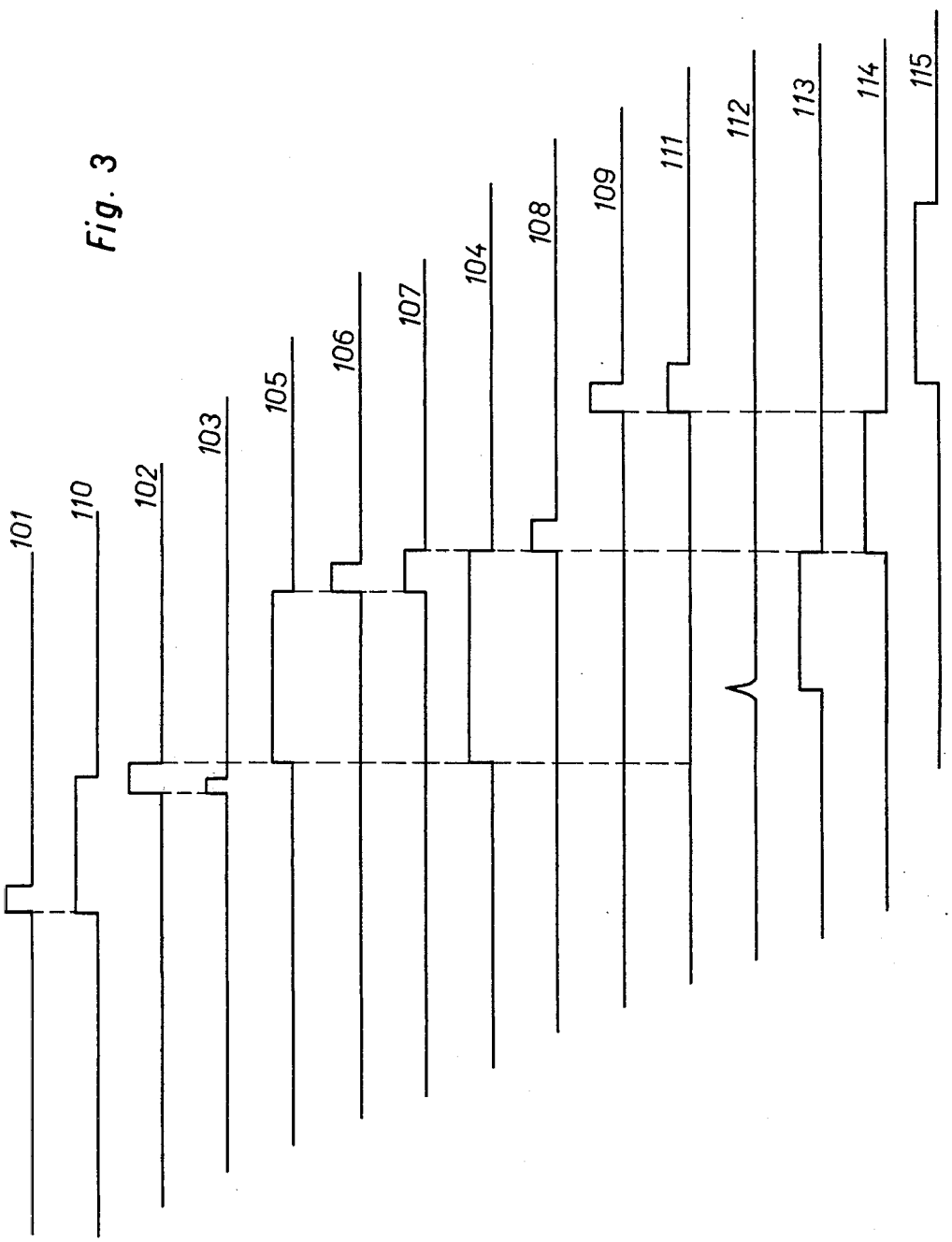

APPARATUS FOR CONVEYING AND TURNING ARTICLES

BACKGROUND OF THE INVENTION

1. Field of the Invention.

The present invention relates to an apparatus for conveying and turning articles, expecially for utilization with article inspection or testing devices along the production line of a plant for manufacturing articles such as glass containers or vessels, wherein the article line conveying device comprises an article track, or path, defined by a conveyor belt arranged laterally thereof and a through belt arranged laterally thereof, in order to remove the vessels to be inspected from the conveying device of the production line and to feed them at intervals from one another into a testing station, and wherein the turning device is disposed at the testing station and comprises a control roller disposed on the one side of the track adapted to be displaceable between an operating position and a rest position, and two pressing rollers arranged sequentially in the direction of travel on the other side of the track and adjacent thereto, the front or entry pressing roller, considered in the direction of travel, being mounted upon a lever and pivotable transversely to the track, the three rollers cooperating together for the purpose of interrupting the travel of the vessels in the testing station and for rotating each vessel at least once about its axis. This invention is especially useful for testing apparatuses, in which the external shape and external dimensions of containers or vessels are inspected and cracks are detected in the vicinity of the vessel mouth, in order to reject these vessels which lie outside the predetermined fabrication tolerances.

2. Description of the Prior Art.

Because the effectiveness of the testing apparatus is very much dependent upon the functioning of the article line conveying and turning device, many devices are already known in many differing forms of construction, including those adapted for special operating conditions.

In a first device, which is described in U.S. Pat. No. 3,101,848 (Uhlig), the vessels to be tested are removed from the conveying device of the production line, which is normally constituted as a plate conveyor, and are conducted upon a curved track having a fixed floor to the testing station and are then returned from there to the conveying apparatus. The track is bounded at its external side by a guide rail and at its internal side by a circulating conveyor belt. The distance between the guide rail and conveyor belt is virtually equal to the diameter of the vessel to be inspected, so that this vessel is frictionally gripped by the conveyor belt and rolled along the guide rail. The guide rail comprises a gap somewhere about the middle of the track. At this point two freely rotating pressure rollers are mounted, which can be displaced by means of a cam disc transversely to the direction of travele. The cam disc also travel. a feed arm, which is disposed on the entry side of the track, so that the pressure roller are always displaced into the track when a vessel is situated in the region of the pair of rollers. The two pressing rollers then constitute, together with the oppsedly situated conveyor belt, a three-point holder for the vessel, which is thus arrested in its conveyed motion and is rotated by the conveyor belt in this position until the pressing rollers are once again withdrawn from the track.

Another device, described in Swiss Patent No. 448,889 (Munz), also possesses a curved track having a fixed floor, of which the external side is bounded by a guide rail and the internal side by a conveyor belt. In this device also, the guide rail has a gap in the vicinity of the testing machine, and two freely revolving pressing rollers are provided at that position. Both pressing rollers are mounted upon pivoting levers and project, in their rest position, into the track. The pressing roller at the entry side can, when a vessel enters, be swung out from the track against the force of a spring, while the pressing roller on the exit side stops the entering vessel. Opposite to the two pressing rollers there is a driven friction wheel, the perimeter of which projects beyond the conveyor belt into the track and the circumferential speed of which determines the speed of revolution of each vessel held by the three rollers. To release a vessel from the testing station, the pressing roller on the exit side can be swung out from the track by means of an electro-magnet. The electro-magnet is regulated by means of a time switching apparatus, which is switched on when the entry pressing roller swings out.

In a further device known from U.S. Pat. No. 3,428,174 (Kulig), a curved track with a fixed floor is again used, the outer side of which track is bounded by a guide rail and the inner side by a conveyor belt. This device comprises, in the vicinity of the testing machine, a driven friction wheel which projects over the conveyor belt. On the side of the track opposite to the friction wheel, two pivotal levers are mounted. A portion of the guide rail is secured to the one lever, while two pressing rollers are fixed to the other. In addition, an electrical contact switch is provided at the entry side of the pressing station. By contacting this switch, each entering vessel causes that portion of the guide rail which is secured to the one lever to be swung back and simultaneously the two pressing rollers situated in their rest position externally of the track to be swung into the track, in which position they constitute, together with the friction roller, a three-point guide for the vessel which is to be rotated on the spot during inspection.

Finally, a device is known from U.S. Pat. No. 3,848,742 (Krenmayr), which likewise comprises a curved track having a stationary floor, in which a guide rail is mounted on the inner side and a conveyor belt on the outer side. In the vicinity of the testing station a friction wheel which can be driven at varying speed projects beyond the guide rail into the track, and two pressing rollers mounted upon pivoting levers can be swung, independently of each other, into the track above the conveyor belt. For the purpose of regulating the differing rotational speeds of the friction wheel and of the pivoting motions of each pressing roller, several electrical switches are provided at the entry side to the testing station, these switches being actuated by the entering vessel.

The devices described above possess at least three features in common. In all of them, the track constitutes an "adjacent track" to the conveying apparatus of the production line. The disadvantage of this is that all vessels must be deflected from this conveying apparatus into the device itself and, after passing through it, must be returned to the conveying apparatus.

Further, in these devices, the vessels are rolled in the track by means of a laterally applied conveyor belt against an oppsedly situated guide rail. The peripheral speed of the vessels is thus twice their speed of translation. This means that, for equal translation speed, vessels of smaller diameter are rotated faster those those of large diameter, and are rolled along the guide rail. It will immediately be obvious to anyone skilled in this technology that the rolling of the vessels and their feed to the testing station at predetermined, equal intervals can only be guaranteed to an upper limit of speed which is a function of the vessel's size. On the other hand, in general, smaller vessels are produced at a more rapid rate than large vessels, resulting in the requirement that smaller vessels should be conveyed at larger translatory speeds through the device. A further disadvantage of the devices described above is that they can only satisfy this requirement within limits.

Finally, in the known devices, at least that pressing roller which is at the exit side is mounted upon a pivoting lever, which is so aligned relative to the through path that the pressing roller is pivoted practically transversely to the track. This leads to the further disadvantage that in particular those vessels which are heavy, if they are not round or possess nonuniform wall thicknesses, can push the exit side pressing roller sideways and thus "open" the three-point guide in the testing station.

SUMMARY OF THE INVENTION

It is an object of the present invention to provide a device which overcomes the above-described disadvantages.

In accordance with the present invention, this object and other objects and advantages are achieved by the combination of a conveyor belt disposed laterally of a line conveying device, means for driving the conveyor belt, a through belt disposed laterally of the line conveying device and spaced from the conveyor belt and cooperating therewith to define a track for conveying the articles at spaced intervals from one another to a testing station, means for driving the through belt, a control roller disposed on one side of the track and displaceable between an operating position in which a portion of its periphery extends over the through belt and into the track, and a rest position in which its periphery lies outside the track, a first pressing roller disposed adjacent the side of the track opposite that of the control roller and being pivotable transversely with respect to the track, and a second pressing roller disposed adjacent the side of the track opposite that of the control roller and downstream of the first pressing roller, the second pressing roller being rotatably disposed on a fixed shaft, the control roller and the first and second pressing rollers cooperating to interrupt the passage of articles proceeding through the track and to rotate each article at least one about its axis at the testing station.

Because the device according to the invention comprises only two elements which can be swung into and out of the track, only one of these elements being actuated, the dead times in this sequence of motion are so short that the inspection speed can be very considerably increased in comparison with the devices hitherto used.

In accordance with a further aspect of the invention, it is possible to set up the device according to the invention in such a way that a track is superimposed upon the conveying apparatus of the production line. The advantage of this is that the vessels to be tested do not need to be removed from the conveying apparatus, nor do they need to be returned to it. By using a driveable through belt instead of a guide rail, the ratio of the translatory to the peripheral speeds can be so adjusted that, even when the translatory speed is high, the peripheral speed does not exceed a critical value. This enables the output rate of the device to be raised to hitherto impossible values, especially for vessels of small diameter, for example for ampoules. The use of an exit pressing roller with a fixed journal makes it possible effectively to prevent heavy or non-circular vessels from opening the three-point guide in the testing station and escaping therefrom.

In accordance with another aspect of the present invention, the guide is still further improved by the control roller being journalled upon a pivoting lever, which in its operating position extends transversely to the track.

The foregoing and other objects, features and advantages of the present invention will become more apparent in light of the following detailed description of a preferred embodiment thereof as illustrated in the accompanying drawings.

DESCRIPTION OF THE DRAWINGS

FIG. 2 is a block diagram of an electronic circuit for monitoring and regulating the movements and measurements.

FIG. 3 is a diagrammatical presentation of the output signals for the switching times of the blocks of the circuit of FIG. 2 and their relative relationships with respect to time.

DESCRIPTION OF THE PREFERRED EMBODIMENT

Figure 1:
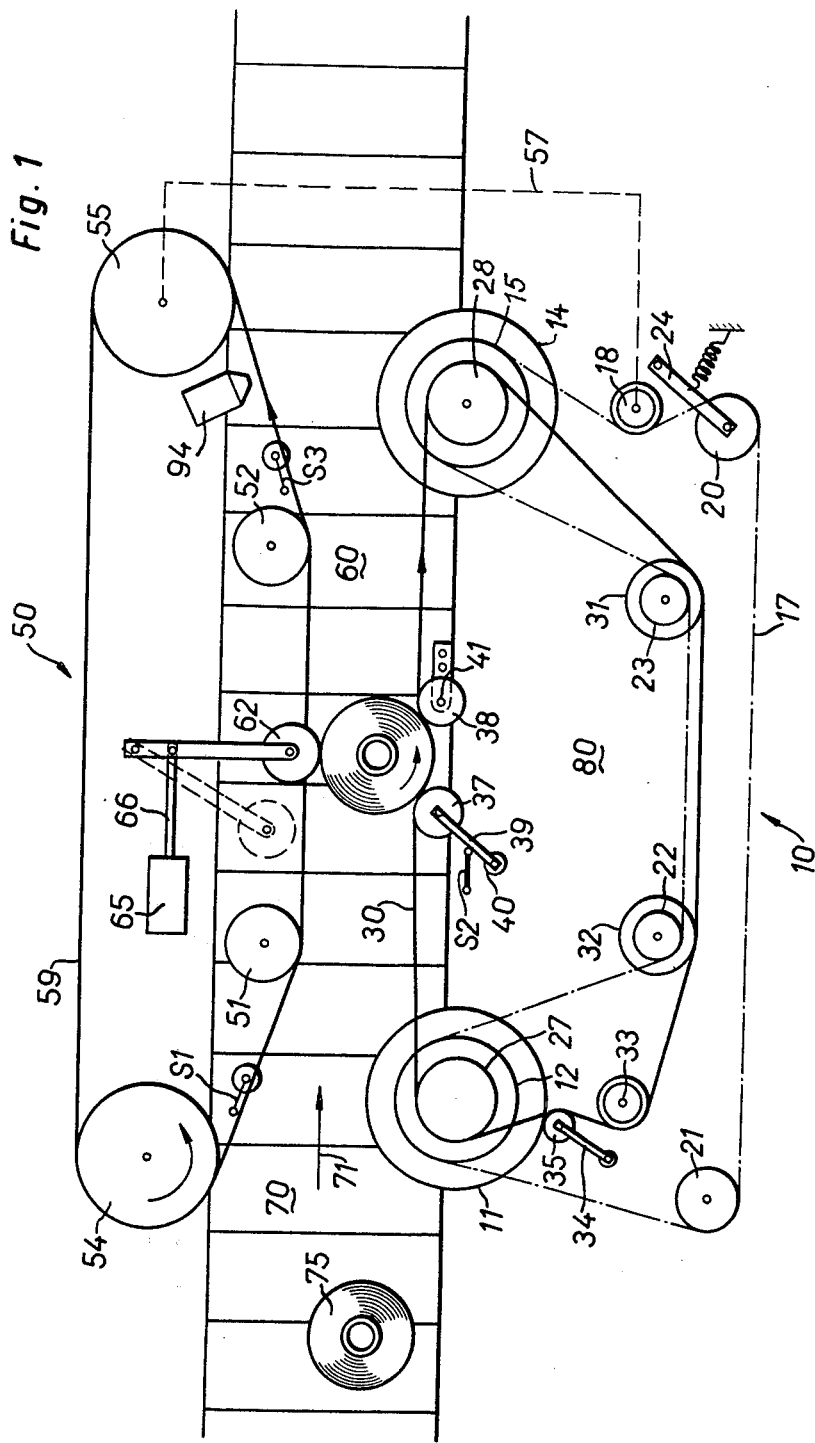
FIG. 1 is a schematic plan view of an article line conveying and turning apparatus according to the invention.

The form of embodiment, shown in FIG. 1, of the new device comprises a front machine portion 10 and a rear machine portion 50, which are disposed over a conveyor 70, which may be a plate conveyor, of the conveying apparatus of a production line. The conveying direction of the plate conveyor 70 is indicated by the arrow 71 and in FIG. 1 runs from left to right. At the entry of the front machine portion 10, a feed roller 11 is mounted, extending with a portion of its periphery over the plate conveyor 70. This feed roller is locked to a drive roller 12 of smaller diameter for rotation therewith. At the exit side of the front machine portion, a braking roller 14 is provided, which likewise projects with a portion of its periphery over the plate conveyor 70 and is locked to a drive roller 15 for rotation therewith. A drive belt 17, driven by a motor 18, runs around the two drive rollers 12 and 15. The speed of this motor 18 is infinitely adjustable. The drive belt 17 is also passed around the guide rollers 20, 21, 22 and 23. Guide roller 20 is journalled upon a pivoting lever 24, which is prestressed or biased, by a spring 25, so that the drive belt 17 runs around said rollers without slip.

Additional conveying rollers 27 and 28 are also disposed on the same axes as the feed roller 11 and braking roller 14, respectively. Both these conveying rollers revolve independently of the feeding and braking rollers. These conveying rollers guide, between the entry and exit of the device, a conveyor belt 30, which also is guided around two guide rollers 31 and 32 and driven by a motor 33. The guide rollers 31, 32 for this conveyor belt are journalled upon the same axes as the guide rollers 22, 23 for the drive belt. All the rollers can revolve independently of one another. The rotational speed of the drive motor 33 for the conveyor belt can be set to two and preferably three stepped values. A tensioning roller 35, journalled upon a pivoting lever 34, is also provided in order to prevent slip of the conveyor belt 30 on the drive motor 33.

Along the plate conveyor 70 and between the entry feed roller 11 and the exit braking roller 14, there are situated two pressing rollers 37 and 38. The entry side pressing roller 37 is journalled upon a pivoting lever 29. This pivoting lever makes an angle of less than 45° with the plate conveyor 70 and is pressed by means of a spring element 40 against the conveyor belt 30. A rubber cylinder is preferably used for this spring element, the lower end of this cylinder being fixed to the platform, not shown, of the front machine portion 10 while its upper end is fixed to the pivoting lever 39. The exit side pressing roller 38 is journalled upon a fixed shaft 41. Both pressing roller 37 and 38 are free to revolve and their circumferences bear against the conveyor belt 30.

The rear machine portion 50 possesses two guide rollers 51 and 52, which extend over the plate conveyor 70 and are at equal distances from the oppositely situated conveyor belt 30. An entry and an exit guide roller 54 and 55 are also provided. The exit guide roller is coupled to the motor 18, provided for driving the drive belt 17, by means of a transmission connection indicted by the broken line 57. Said roller guide a through belt 59. In the region between the guide rollers 51 and 52, this through belt runs virtually parallel to the conveyor belt 30 and constitutes, together with the latter, the side boundaries of a track 60.

The rear machine portion 50 also possesses a control roller 62. This control roller is journalled, so as to freewheel, upon a pivoting lever 63. The pivoting lever can be swung through an angle of about 30° between a working position and a rest position, by means of a reversible compressed air cylinder 65 acting through a connecting rod 66. In the working position shown in full lines in the drawing, the pivoting lever is situated practically transversely to the track 60 and the control roller 62 projects over the through belt 59 into the track. In the rest position, indicated by broken lines, the pivoting lever is oblique to the track and the control roller is swung out of the track and behind the through belt.

To describe, for example, the method of operation of the new device it should be assumed that the motor 18 for the drive belt 187 and the through belt 59 is driving these two belts at a speed of 40 meters per minute while the motor 33 is driving the conveyor belt 30 with a speed of 110 meters per minute. The rotational direction of the conveyor belt and through belt corresponds, in the region of the track 60, to the conveying direction 71 of the plate conveyor. The distance between the front and rear machine portions 10 and 50 is so adjusted that the width of the track bounded laterally by the conveyor belt 30 and the through belt 59 is slightly smaller than the diameter of the vessels to be conveyed. Each vessel 75 which is brought on the plate conveyor 70 runs up against the through belt 59 or the feed roller 11, which constitute in practice a wedge-shaped, narrowing entry path for the track. The through belt and the feed roller cause even those vessels which are standing alongside each other on the plate conveyor to be fed in succession into the track. As described above, the through belt 59 and the drive belt 17 for the feed roller 11 run at the same speeds. Because the feed roller has a larger diameter than its associated drive roller 12, its peripheral speed is correspondingly greater. Consequently, the arriving vessels are driven more rapidly by the feed roller than by the through belt, with the consequence that the vessels are rolled along the through belt and the original translatory motion has an additional rotational motion superimposed upon it.

The vessels introduced successively into the track 60 are gripped on the one side by the conveyor belt 30. The conveyor belt always travels at a higher speed than the through belt and the feed roller. The vessels are therefore rolled on the through belt more rapidly by the conveyor belt than by the feed roller and are conveyed forwards. Because this conveying speed is greater than the feed speed, the vessels are singled out and spaced at intervals from one another in the region between the feed roller 11 and the entry side pressing roller 37. By suitable selection of the ratio between the speeds of the two belts, a sufficiently large spacing is achieved between successive vessels for each vessel only to reach the testing station after the preceding vessel has already left that station.

When a vessel enter the turning device of the testing station comprising the two pressing rollers 37 and 38 and the control roller 62, the entry pressing roller 37 is briefly swung out of the through track, from its operating position illustrated in FIG. 1, against the force of the spring element 40. As soon as the entering vessel has come up against the fixed-journal exit side pressing roller 38 and the entry pressing roller 37 has again sprung back into its operating position, the vessel is guided by the two pressing rollers and the control roller 62. Because the vessel, while in the turning device, does not roll on the through belt but on the freewheeling control roller, the entire circulating speed transmitted from the conveyor belt 30 to the periphery of the vessel is converted into a rotational motion, which is very much larger than the rolling speed on the through belt. Because the entry pressing roller 37 and the control roller 62 are journalled upon pivoting levers which, in the operating position, are oriented practically radially towards the center point of the turning device, the result achieved is that the forces acting upon the rollers with very high rotational speeds of the vessel are accepted by the bearings of the pivoting levers but not by a spring element or a swivelling mechanism.

After at least one revolution of the vessel in the turning device, the control roller 62 is swung out of its operating position, as illlustrated in full lines in FIG. 1, into the rest position indicated by broken lines. The pressure exerted by the conveyor belt 30 upon the vessel then presses the vessel against the through belt 59. Because the circulating speed of the through belt is considerably slower than the peripheral speed of the vessel, the vessel rolls along the through belt, and is strongly accelerated in the direction of travel. This acceleration causes the vessel to roll out, against the elastic through belt, around the exit side pressing roller 38, thus leaving the turning device.

After the vessel 75 has left the turning device, it is again frictionally gripped between the conveyor belt 30 and through belt 59 and is rolled along the through belt, as has already been described in connection with its entry into the turning device. At the end of the track, the vessel is transferred from the conveyor belt 30 to the more slowly revolving braking roller 14. The peripheral speed of this roller, like that of the feed roller 11, is only slightly greater than the circulating speed of the through belt 59, so that the rotational speed of the vessel is retarded.

The track widens out in the region between the braking roller 14 and the guide roller 55 so that the vessels are released from two-sided guiding and are again taken over by the plate conveyor 70 of the production line.

The pivoting of the control roller 62, which is necessary for releasing a vessel from the turning device, is, as has already been described, effected by the reversible cylinder 65. A timing control circuit, not shown, is provided for the purpose of determining the instant of pivoting of the control roller as a function of the entry of a vessel into the turning device. This timing circuit contains an electrical switch which, when the entry side pressing roller 37 swings in, that is when a vessel enters the turning device, is actuated and activates an electronic delay circuit. After the elapse of a predetermined, adjustable interval of time, this delay circuit produces a control signal which activates an amplifier, which actuates a magnetic reversing valve for the compressed air cylinder 65. Such timing control circuits are well known to persons skilled in the art and have been mentioned, for example, in the above-named Swiss Pat. No. 448,889, and a detailed description will, therefore, not be given of them here.

The trapezoid-shaped region 80 indicated in FIG. 1 is provided for the disposition thereto of a testing head. At the end of the through track (as viewed in the direction of travel), an ejector 94 is provided for rejecting faulty vessels. Suitable testing heads and ejectors are also known to persons skilled in the art and will not be described in more detail.

It is necessary, in order that the above described operational sequence shall be carried out satisfactorily, for the vessels 75 to be spaced sufficiently far apart in the device to enable them to remain during the predetermined, limited period of time in the testing station and for the ejector then to be activated when a vessel found to be faulty is conveyed through its field of action. In order to satisfy these requirements, an electronic control circuit is provided, the block diagram of which is indicated in FIG. 2. In addition, three contact switches are situated along the track to supply the input signals for this control circuit. The switch S1 is situated in the entry region of the device, between the guide roller 54 and the guide roller 51; the switch S2 cooperates with the pivoting lever 39 of the entry side pressing roller 37, while the switch S3 is situated in the exit region of the device, between the guide roller 52 and guide roller 55.

The switches S1 and S3 each comprise a pivoting switching lever, with a roller fixed to its free end which, in the rest position, bears against the through belt 59. Each vessel 75 conveyed through the device presses upon the conveyor belt and through belt and thereby actuates the switches S1 and S3 as it passes them. The switch S2 also comprises a pivotal lever arm, the free end of which bears against the pivoting lever 39 of the entry pressing roller 37; when the pivoting lever arm is pivoted by an entering vessel, the switch is actuated.

Referring to FIG. 2, switch S1 is connected via an impulse emitter 80 with the one input of an entry monitoring device 81, the switch S2 is connected with the input of a resetting signal emitter 83 and with an input of a rotation time emitter 82, the switch S3 is connected through a device 84, which suppresses distortions of the switching signal which may be produced by contact chatter, to an input of an exit monitoring device 86 and an input of a signal store 85.

A line leads from the output of the entry monitoring device 81 to an input of a gate circuit 95. The output of the resetting signal emitter 83 is connected to a second input of the rotation time emitter 82 and an input of the testing head 87. From the output of the rotation time emitter, lines lead to a fixed time emitter 88, to a first control switch 89 and to an input of an adding circuit 90. The output of the first control switch 89 is connected to a second input of the entry monitoring device 81 and to a magnetic valve on the reversible compressed air cylinder 65. The output of the fixed time emitter 88 leads to the second input of the adding circuit 90, the output of which is connected to a second input of the testing head 87, the input of a second control switch 91 and an input of a gate circuit 92. The output of the testing head 87 is connected to the second input of this gate circuit 92, from the output of which a line leads to an input of a signal intermediate store 93. The output of this signal intermediate store leads to the second input of the signal store 85. The second control switch 91 is connected to the second input of the exit monitoring device 86 and to the other input of the signal intermediate store 93 and also to the magnetic valve of the reversible compressed air cylinder 65. The output of the signal store 85 leads to the magnetic valve of a pneumatic ejector 94. From the output of the exit monitoring device 86, a line leads to the second input of the gate circuit 95, the output of which is connected to the main switch 96 of the device.

FIG. 3 indicates diagrammatically the output signals or switching times of the individual switches or component groups and control devices, and also the relative time displacements between them. For the purpose of describing the method of operation of the control circuit, let it be assumed that the plate conveyor 70 of the production line has a speed of 0.43 meters per second and conducts approximately 240 vessels per minute to the device. The vessels are assumed to have a diameter of 66 mm. The through speed of the device must be sufficiently high to prevent the vessels stacking up before the entry into the device and before the testing station. A suitable through speed is for example 1.43 meters per second. This through speed is achieved with a circulating speed of the conveyor belt 30 of 2.5 meters per second and a circulating speed of the through belt 59 of 0.36 meters per second. As soon as the vessel has been engaged by the feed roller 11 and has been conveyed by the through belt 59 into the track, this vessel swings over the roller of the switch S1 in a period of a few milliseconds and thereby produces a signal 101. The signal 101 is converted in the impulse emitter 80 to a rectangular impulse 110 and is transmitted to the entry monitoring device 81 and is stored there. The duration in time of the rectangular impulse 110 is longer than the duration of the signal 101 from the switch S1. In a practical form of embodiment of the device, the distance between the switch S1 and the entry side pressing roller 37 is about 12 cm, which corresponds for the through speed given above to a duration of about 85 milliseconds. When entering the testing station, the vessel presses the entry pressing roller back and thereby produces at the switch S2 a further signal 102. This further signal is transmitted to the resetting signal emitter 83 and to the first input of the rotation time emitter 82. The front face of the signal 102 activates the resetting signal emitter 83, which, without any time delay, transmits a resetting impulse 103 to the testing head 87 and to the second input of the rotation time emitter 82. The back face of the same signal 102 then activates the rotation time emitter 82, which produces a rotation time impulse 105 having an adjustable duration. The length of this impulse must be at least equal to the time required for one single revolution of the vessel in the testing station. From the speed given above for the conveyor belt 30, it is easy to calculate that a vessel having the stated diameter revolves once about its axis in 80 milliseconds. For the present example, it may be assumed that the vessel executes approximately 1.25 revolutions in the testing station, so that the rotation time impulse 105 is set to an impulse duration of 100 milliseconds. The rear face of the rotation time impulse 105 activates the first control switch 89, which produces a control impulse 106, which is transmitted to the magnetic valve of the reversible compressed air cylinder 65 and to the second input of the entry monitoring device 81. The control impulse 106 causes actuation of the compressed air cylinder, causing the control roller 62 to swing out of the operating position into the rest position indicated in broken lines in FIG. 1 and thus initiating the exit of the vessel from the testing station. The rear face of the rotation time impulse 105 activates also the fixed time emitter 88, which produces a fixed time impulse 107, the duration of which is somewhat smaller than the time required for the vessel to leave the testing station. The rotation time pulse 105 and the fixed time pulse 107 are added together in the adding circuit to give the testing time impulse 104. The testing time impulse 104 is transmitted to the second input of the testing head 87 and, via the gate circuit 92, to the signal intermediate store 93 and, during the duration of the impulse, activates the testing devices and the signal intermediate store. The rear face of the testing time impulse 104 activates the second control switch 91, whihch produces a signal 108, which is transmitted to the exit monitoring device 86, to the signal intermediate store 93 and to the magnetic valve for the reversible compressed air cylinder 65. This signal 108 causes the control roller 62 to be swung back into its operating condition, after the vessel has meanwhile left the testing station.

The vessel leaving the testing station is conveyed forwards at the same speed as at entry and reaches the switch S3 about 80 milliseconds after leaving the testing station, for the conditions stated above. The switch S3 now produces a signal 109, which is converted into an impulse 111 in a device 84 for preventing the further transmission of contact chatter. This impulse 111 is transmitted to the signal store 85 and the exit monitoring device 86.

If, during the testing time, one or more of the testing systems mounted in the testing head detects a fault in the vessel, then a fault signal 112 is passed through the gate circuit 92 to the signal intermediate store 93 and is stored there as a signal 113. At the end of the testing time, the impulse 108 emitted by the second control switch 91 causes the contents of the signal intermediate store 93 to be transmitted to the signal store 85 and to be stored there as a signal 114. If, when the exit impulse 111 reaches the signal store 85, a fault signal 114 is stored in that store, then a control impulse 115 is generated by the signal store 85 and is transmitted to the ejector device 94. The control impulse 115 possesses a time delay with respect to the front face of the impulse 111 corresponding to the signal from the switch S3, which delay corresponds to the time taken for the vessel to travel from the switch S3 to the vicinity of the ejector 94. The control impulse 115 excites a magnetic valve, which opens a compressed air line, so that the faulty vessel is blown by means of compressed air from the plate conveyor 70.

The entry and exit monitoring devices 81, 86 respectively are intended to prevent the incoming and outgoing vessels from being too close together. If the entry monitoring device 81 receives,, via the delay circuit 80, two successive signals from the switch S1, without a signal from the control switch 89 being received in between, this means that one vessel has entered the device before the testing station has opened for the discharge of the preceding vessel. In such a case, the entry monitoring device gives a signal impulse, via the gate circuit 95, to the main switch 96, which switches off the entire device and triggers an alarm signal. If two successive signals 108 are transmitted by the second control switch 91 to the exit monitoring device 86, without an impulse 111 corresponding to a signal from the switch S3 having been supplied between them, this means that a vessel has left the testing station before the preceding vessel has passed the switch S3, and left the device. In this case, the exit monitoring device 86 produces a switching impulse, which is transmitted, via the gate circuit 95, to the main switch 96, in order to switch off the device.

In the example given, about 0.25 seconds is required for the entire sequence and for the testing of a vessel, and the minimum interval between two successive vessels is about 0.1 seconds. It is therefore possible for more vessels per unit time to be conveyed by the line conveying device and tested in the testing station, then the plate conveyor of the production line supplies.

In the construction of the electronic control circuits, components and component groups are used which are known to any person skilled in the art and are for the major part standard commercial items. A detailed description of these components and groups, therefore, is not provided herein.

There has thus been described a preferred embodiment of an article line conveying and turning device in accordance with the present invention. It will be understood by those skilled in the art that various changes and omissions in the details thereof may be made therein without departing from the spirit and scope of my invention which is to be limited only as set forth in the following claims.

What I claim as novel and desire to secure by Letters Patent of the United States is:

1. Apparatus for conveying articles proceeding on a line conveying device to a testing station and for rotating the articles at the testing station, comprising:
   a conveyor belt disposed laterally of the line conveying device;
   means for driving said conveyor belt;
   a through belt disposed laterally of the line conveying device and spaced from said conveyor belt and cooperating therewith to define a track for conveying the articles at spaced intervals from one another to the testing station;
   means for driving said through belt;

a control roller disposed on one side of said track, said control roller being displaceable between an operating position in which a portion of its periphery extends over said through belt and into said track, and a rest position in which its periphery lies outside said track;

a first pressing roller disposed adjacent the side of said track opposite that of said control roller, said first pressing roller being pivotable transversely with respect to said track; and a second pressing roller disposed adjacent the side of said track opposite that of said control roller and downstream of said first pressing roller, said second pressing roller being rotatably disposed on a fixed shaft, said control roller and said first and second pressing rollers cooperating to interrupt the passage of articles proceeding through said track and to rotate each article at least one about the axis of the article at the testing station.

2. Apparatus for conveying and turning articles as defined in claim 1, wherein said means for driving said through belt are adjustable to vary the speed at which said through belt is driven.

3. Apparatus for conveying and turning articles as defined in claim 1, wherein said control roller is displaceable along a path which is inclined to said track.

4. Apparatus for conveying and turning articles as defined in claim 1, wherein said control roller is rotatably disposed on a pivoting arm whereby the point on the periphery of the control roller which is farthest from the pivot of said pivoting arm describes an arc of a circle during displacement of said control roller between the rest and operating positions.

5. Apparatus for conveying and turning articles as defined in claim 1, wherein said first and second pressing rollers bear against the side of said conveyor belt opposite from said track whereby said conveyor belt partially surrounds and bears against an article which is being rotated about its axis.

6. Apparatus for conveying and turning articles as defined in claim 1, wherein said first pressing roller is rotatably disposed on a pivotable arm, said arm being biased towards a rest position and pivotable out of the rest position by the entry of an article into the testing station.

* * * * *

PO-1050
(5/69)

UNITED STATES PATENT OFFICE
CERTIFICATE OF CORRECTION

Patent No. 3,938,653                Dated February 17, 1976

Inventor(s) Edmund Senger

It is certified that error appears in the above-identified patent and that said Letters Patent are hereby corrected as shown below:

Col. 1,
    line 61, "travel." should read --governs--
    line 62, "roller" should read --rollers--

Col. 2,   line 8, "machine" should read --station--
    line 29, "machine" should read --station--

Col. 3,   line 3, "those" first instance should read --than--
    line 28, "an" should read --the--
Col. 4,   line 45, "entry of" should read --entry side of--

Col. 5,   line 12, "lever 29" should read --lever 39--
    line 30, "indicted" should read --indicated--
    line 31, "roller" should read --rollers--
    line 52, "belt 187" should read --belt 17--

Col. 6,   line 27, "enter" should read --enters--

Col. 7,   line 36, "will not" should read --will therefore not--

Col. 8,   line 52, "the" should read --a--

Col. 9,   line 42, "whihch" should read --which--

Col. 11, line 18, "one" should read --once--

Signed and Sealed this

Twenty-seventh Day of July 1976

[SEAL]

Attest:

RUTH C. MASON
*Attesting Officer*

C. MARSHALL DANN
*Commissioner of Patents and Trademarks*